Aug. 14, 1934.    L. T. HOPKINSON    1,970,308
METHOD OF CANNING SALMON AND PRODUCT RESULTING THEREFROM
Filed April 5, 1933
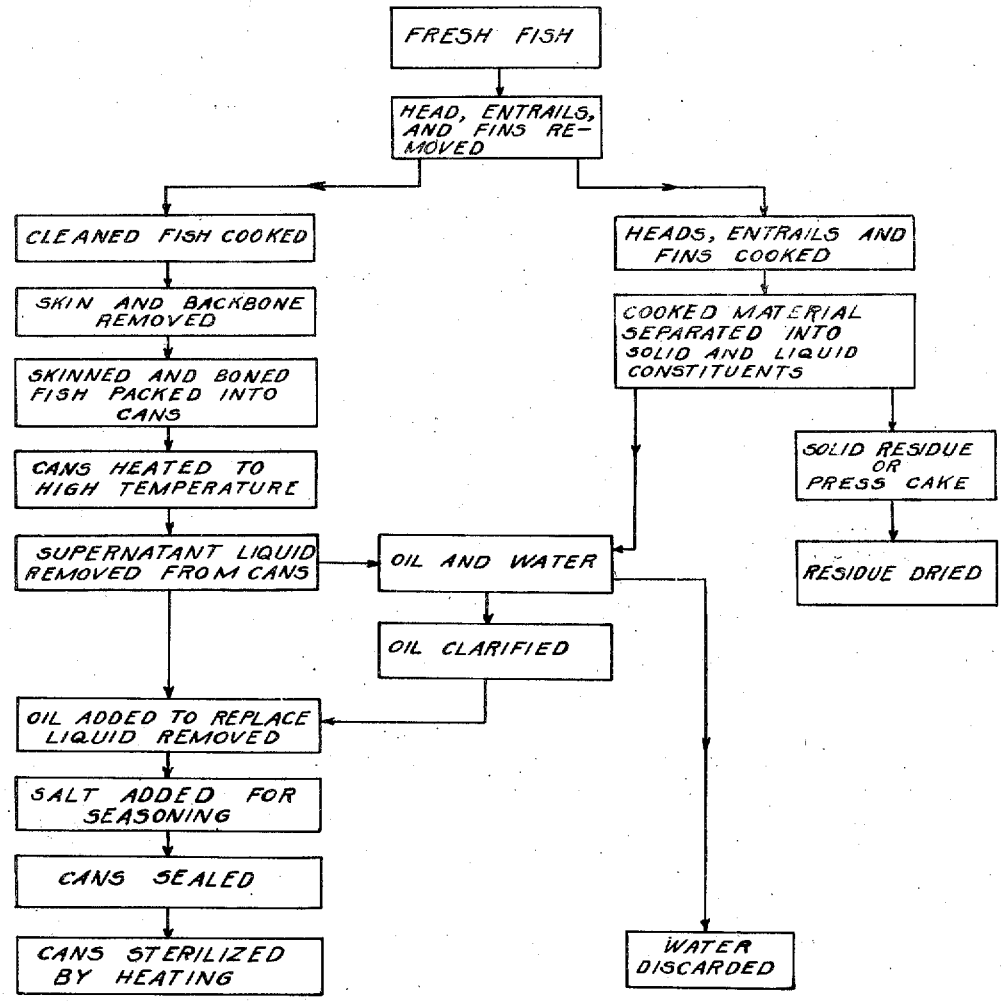
Inventor
Laurence T. Hopkinson,
By Dye & Kirchner,
Attorneys.

Patented Aug. 14, 1934

1,970,308

UNITED STATES PATENT OFFICE 1,970,308

METHOD OF CANNING SALMON AND PRODUCT RESULTING THEREFROM

Lawrence T. Hopkinson, Washington, D. C.

Application April 5, 1933, Serial No. 664,655

6 Claims. (Cl. 99—8)

This application is a continuation in part of my co-pending application Serial No. 481,775, filed September 13, 1930.

My invention relates to the canning of salmon, and provides a novel product produced by practice of a novel method.

Practice of my novel method on any of the several grades and species of salmon produces a food product which in food value, appearance, texture, keeping qualities, and other desirable factors, is superior to the product resulting from practice on a comparable grade or species of salmon of any method known to the art prior to my present invention. A particular and important object of the invention, however, is to provide a method capable of producing, from salmon of the less desirable and cheaper grades, a canned food product which is, in the factors enumerated above, equal or superior to salmon of the more costly grades when processed by any of the methods heretofore known.

There is a very great difference between the commercial value of salmon of the highest grade and that of salmon of the lowest grade. For example, in February, 1933, the wholesale prices per case of forty-eight one-pound cans of Pacific salmon at Seattle, Washington, were as follows:

| | |
|---|---|
| Red Chinook | $10.60 |
| Puget Sound Red Sockeye | 10.40 |
| Alaska Red | 5.60 |
| Puget Sound Coho | 4.00 |
| Pink | 3.00 |
| Chum | 2.60 |

While my invention may be practiced to advantage on high priced Red Chinook salmon, resulting in an enhancement of the properties which make this species the grade of highest commercial value, a feature of especial importance is the capacity of the invention to be practiced on the low priced Chum, Pink, Coho and Alaska Red salmon, which results in imparting to these varieties the physical properties of color, flavor, texture, and resistance to disintegration which have been heretofore peculiar to canned Red Chinook salmon and which alone have enabled that variety to command the highest price.

The commercial value of canned salmon is determined by the following factors taken together: oil content; moisture content; firmness of the meat; and color of the meat. The deeper shades of red meat bring a higher price than the lighter shades; firmer meat being considered superior to soft or mushy meat; and salmon having a higher percentage of oil selling for more than canned salmon of low oil content. The food value of the total contents of a can of Red Chinook salmon is greater than that of the contents of the same size can of any other species of salmon because the Red Chinook contains more oil and less water, but food value as such never has been a major criterion of commercial value or selling price.

Hereinafter in this specification and in the appended claims I shall use the term "high grade salmon" to designate Red Chinook, while all other commercial varieties will be denominated "low grade salmon".

By "edible portions" I mean the parts of the salmon now ordinarily canned as food; and by "inedible portions" I mean the parts of the salmon now ordinarily not canned as foods, comprising principally the heads, fins and entrails.

Heretofore both low grade salmon and high grade salmon as defined above have been processed in the same way, which is essentially as follows: The raw fish are cleaned, i. e., the edible portions are separated from the inedible portions. The edible portions are packed into cans, the cans are sealed, and their contents sterilized by heat. In this connection it should be noted that the raw fish is sealed in the can before it is cooked. After cooking, the cans are labelled and boxed and are ready to be distributed to the consumer. The inedible portions are in most cases discarded as waste; but comparatively small quantities, constituting a small fraction of all the waste of the salmon canning industry, is processed to provide as by-products oil, used principally in the manufacture of soap and paint, and press cake, used as a fertilizer and stock food.

Comparative analyses of canned low grade salmon and canned high grade salmon show a marked difference in the percentage of oil present and in the ratio of oil to water. All grades of raw salmon contain oil and water, the high grade fish containing more oil and less water than the low grade fish. Present processing methods work no change in the oil-water ratio; that is, a can of any kind of salmon produced by the conventional method contains oil and water in exactly the same proportions as existed in the uncooked edible portion of the fish as charged into the can. The percentages of inorganic matter and proteins are respectively substantially the same in low and high grade salmon. Only in oil and water content are the two grades substantially different with respect to constituent ingredients. Thus, Red Chinook, the high grade salmon, contains 15.7 per cent oil, and Chum salmon, one of the important members of the low grade group, contains only 6.7 per cent oil.

I have discovered that the natural oil-water ratio of the edible portion of the raw salmon need not be carried without alteration into the cooked meat in the can, but may be materially changed. I have discovered that if the oil percentage of canned low grade salmon be increased and the water percentage decreased to substantially that of canned high grade salmon, the physical properties and the food value of the low grade salmon are correspondingly changed, becoming substantially the same as those of canned high grade salmon or superior thereto.

The product provided by my invention is therefore canned salmon characterized by an enhancement of the physical properties which determine its commercial value and by an increase in food value, as compared with salmon of an originally similar grade processed by the best methods heretofore known, and my invention also contemplates a method of processing salmon to attain the results hereinabove indicated which possesses certain advantages and effects certain economies as hereinafter more fully explained.

My invention is therefore based on the discovery that the properties of canned salmon which determine its commercial worth and food value may be improved by increasing the amount of salmon oil in proportion to the other constituents of the contents of the can, and on the further discovery that every whole raw salmon, whether of low or high grade, contains in the aggregate of its edible and inedible portions ample edible oil to permit the edible portion to be canned in a concentration of salmon oil sufficiently high to accentuate the desired physical properties and the food value of the canned meat. Briefly, the invention contemplates extracting oil from inedible portions and substituting this oil (which I have found to be edible and palatable) for the water and/or skin, bone and similar useless and deleterious ingredients of the normal canned product.

It will be observed that my invention requires no foreign oil, i. e., no oil produced from sources other than salmon itself, and consequently practice of the invention does not involve the burden of purchasing and transporting to the cannery, frequently located on shipboard or in remote and inaccessible regions, foreign oils such as olive, cotton seed, peanut oil and the like. The invention is thus distinguished from prior methods of canning fish which include the step of adding an oil not derived from the variety of fish being canned, the distinction running not only to the kind and source of oil used and the method by which it is produced, but also to the purpose and effect of adding it to the other constituent material of the canned product.

My invention is by no means limited to the use with the edible portions of any variety or grade of salmon of oil derived exclusively from that variety or grade. I have found that oil from any variety or grade may be used with the edible portions of salmon of other varieties or grades. In some cases there is an advantage in using oil from high grade salmon with the edible portions of low grade salmon, since such oil is sometimes capable of enhancing the color of the meat to a more pronounced degree than is oil from salmon of the same variety or grade as that from which the meat was taken. In this connection it should be noted that almost all canneries receive during the course of a season catches of salmon of all varieties and grades, so that practically all types of salmon oil are available at each cannery. There is therefore considerable advantage in the capacity of my invention to be practiced by the use of any of these oils on any of the meat to be canned, according to convenience, the availability of the oil, and any other factors which may arise in particular instances.

A feature of subsidiary importance of the invention in a preferred embodiment is the elimination from the canned product of the objectionable skin and backbone now universally included in greater or less quantity. The skin and bone affect adversely the flavor and appearance of the product, and their removal according to the preferred embodiment of my invention provides room in the can for an additional amount of oil. The same comment may be made with respect to the water which has heretofore formed a large constituent of the liquid ingredients of the canned product. According to my invention most or all of the free water naturally occurring in the edible portion of the fish is removed and oil is substituted therefor, for the purposes hereinbefore indicated.

With the foregoing and other objects in view, as will more clearly appear hereinafter, the invention comprises the novel steps and the novel combination of ingredients which will now be described in detail.

The accompanying drawing, which forms part of this application for Letters Patent, illustrates diagrammatically the several steps in a preferred embodiment of the method of the present invention.

Referring now to the drawing, the raw material on which the process is practiced is raw, fresh salmon, as has been explained.

The raw, fresh fish are first cleaned or dressed by hand or machine in any approved manner. This operation consists in removing the head, entrails and fins, and these materials, known aggregatively as fish waste, are saved for further processing to be described hereinafter. It is to be noted that the skin and backbone are preferably not removed from the fish in the initial cleaning step.

The cleaned fish are next subjected to a preliminary cooking step, which consists in adding water and boiling the fish in a vessel for approximately six to eight minutes. Upon the completion of this boiling operation the fish meat is softened and loosened sufficiently to permit the backbone and outer skin to be removed. This removal is next effected and may be accomplished in any desired manner. I have found that the skin and backbone are capable of such easy separation from the fish meat after the preliminary cooking step that removal by hand is entirely practical and economical from an operating cost standpoint. Moreover, hand removal possesses the advantage of minimizing the breaking of the fish meat into small fragments.

The water in which the fish have been boiled is next drained off and the skinned and boned fish packed into open containers, which may of course be glass jars or tinned sheet metal cans adapted later to receive airtight closures. These cans are next subjected to a relatively high temperature for a time long enough to boil out of the fish some of the oil and water contained therein. This excess oil and water is hereinafter referred to as the supernatant liquid. The cooking time required in this second heating step varies of course with different varieties and sizes of fish, being, for example, in the case of a typical run of Coho salmon, fifteen to twenty minutes.

The second heating of the fish having been completed, the supernatant liquid, which consists primarily of the water and oil driven out of the fish meat, is separated from the fish meat. This separation may be effected in any convenient manner, but I prefer to decant the liquid out of the cans by tilting them momentarily from their upright positions. As an alternative of this second heating step which has just been described, the excess liquid may be separated from the fish by evaporation. Thus, the filled cans may be inverted over a grid or the like to prevent dropping out of their solid contents and to permit the excess liquid to be drained off during the heating operation. Similarly, the excess liquid may be distilled out of the open tops of the upright containers.

The separated liquid is run into a vessel and there combined with other similar liquid extracted from the fish waste resulting from the initial cleaning operation as follows:

The heads, fins and entrails are charged into a vat and boiled until substantially all the oil has been liberated from the cells and has passed into the supernatant liquid partially as a mixture and partially as an emulsion. The resulting cooked product is of fluid consistency, more liquid than solid, and is separated into its solid and liquid constituents by any suitable method, such for example, as by operation of a filter press. The solid product is then dried to form as a by-product of my process the well known press cake of commerce, valuable as a fertilizer and as poultry and cattle food.

The liquid product of the pressing operation is a mixture or emulsion of fish oil and water similar to that decanted from the cans of cooked fish meat, and as has been described is combined in a vessel with the decanted liquid. This liquid is then processed to separate the oil from the water, by centrifuging, heating and decanting or in any other way. The water is discarded as waste and the oil preferably clarified by further heating and/or filtering.

The clarified oil is next run into the cans or other containers of cooked fish meat to replace the water which has been removed. If desired, additional cooked fish meat may be packed into the cans before the oil is introduced, thus increasing the quantity of meat contained in each can. In any event, however, the interstices between the pieces of cooked fish meat in each can are filled with fish oil and the surface of the can's contents is covered with oil.

It will be appreciated that the only object of mixing together the liquid constituents of the waste and the liquids removed from the fish meat and then separating the oil from the mixture is to obtain a concentration of oil in the can sufficient to cover the fish meat and providing a maximum of oil and a minimum of water. If less than a maximum yield of canned meat from a given run of salmon is to be prepared according to my new method, either the oil from the waste or the oil from the meat alone may be used.

The usual quantity of common salt or other seasoning may next be added to the contents of each container and the containers are then hermetically sealed in the customary manner. The filled and sealed containers are finally heated at a temperature above the boiling point of their contents for approximately ninety minutes more or less, to sterilize the contents by destroying bacteria and incidentally complete the cooking operation according to the usual cannery practice.

One of the important advantages of the new product described hereinabove resides in its high vitamin A and D content. Oil produced from those portions of salmon at present canned as food contains these vitamins to a small extent, but the oil produced from salmon waste is especially high in these vitamins, being superior to good grade medicinal cod-liver oil in vitamin D potency and fully equal in vitamin A content. Moreover, the salmon oil constituent of my product lacks the disagreeable taste that is characteristic of cod-liver oil. My product possesses therefore excellent food and therapeutic values heretofore known in this art since it contains a vitamin source never before utilized in the canning of food fish.

The vitamin potency of the contents of a can of salmon prepared according to present methods varies both absolutely and relatively according to species. For example a can of Chinook salmon contains more vitamins than a can of Chum salmon because there is more oil in the can and because the oil itself is intrinsically more potent. The oil prepared from salmon waste also varies according to species but differs from the oil contained in ordinary canned salmon in that the waste oil is, for any given species, from one and one-half to two times as potent in vitamins as the oil contained in the ordinary pack of that species. Therefore when in my product the oil content of the can is doubled by the addition of oil from the waste, the vitamin potency of the product becomes two and one-half to three times as great as that of the ordinary pack of the same species.

Another important advantage of the new product described hereinabove resides in its high iodine content. Canned salmon packed according to present methods contains iodine in the proportion of about 120 to 750 parts per billion and averages about 250 parts per billion whereas the oil prepared from salmon waste contains from about 5,500 to 7,500 parts per billion and averages about 6,600 parts per billion. It is well known that marine products contain a higher percentage of iodine than any other common foods and, for this reason they are recommended for consumption in the so-called goiterous belts where the iodine content of the water and foods is below normal. My product possesses therefore a second group of therapeutic values heretofore unknown in this art since it contains an iodine source never before utilized in the canning of food fish. A can of salmon prepared according to my method contains an average of 625 parts of iodine per billion compared with 250 parts in ordinary canned salmon. The significance of this difference is found in the fact that if the thyroid requirement is to be satisfied one must consume a normal portion of ordinary canned salmon three or four times a week whereas the same amount of iodine is made available by consuming in the same period only one or two portions of canned salmon prepared according to my method.

It is to be understood that I have described hereinabove for purposes of exemplification one preferred form of embodiment of my invention. The invention may be modified in various particulars, but all such modifications, to the extent that they incorporate the principles set forth in the appended claims, are to be deemed within the scope and purview thereof.

I claim:

1. The method of preparing low grade salmon for food which includes removing the inedible portion of the salmon, cooking the edible portion, extracting oil from the inedible portion, removing the supernatant liquid from the cooked salmon, separating the oil from said liquid, packing the edible portion into containers, covering with oil derived from the edible and inedible portions, and then sealing the containers.

2. The method of preparing low grade salmon for food which includes cleaning the salmon of inedible waste, packing the edible portion of the salmon into containers, removing free water from the salmon in the containers, extracting oil from the waste, covering the fish in the containers with said oil, and sealing the containers.

3. The method of preparing relatively low grade salmon for food which includes cleaning the salmon to remove the heads, entrails and fins, cooking the cleaned salmon to loosen the skin and backbone, removing the skin and backbone, heating the salmon meat, removing the free liquids from the salmon meat, extracting oil from said liquids, extracting oil from some at least of the heads, entrails and fins, associating in containers the cooked salmon meat with oil from both sources, and sealing the containers.

4. The method of preparing relatively low grade salmon for food which includes removing the head, entrails and fins, cooking the cleaned salmon, extracting oil from some at least of the head, entrails and fins, removing the supernatant water from the cooked salmon, and replacing said water with said oil.

5. A substantially water-free canned salmon product comprising the combination of a quantity of cooked edible portion of relatively low grade salmon and a quantity of salmon oil greater than that naturally occurring in said quantity of edible portion, both the edible portion and the oil being intimately associated in a sealed container.

6. A substantially water-free canned salmon product comprising the combination of a quantity of cooked edible portion of relatively low grade salmon including substantially all the oil naturally occurring in said quantity and a quantity of oil derived from inedible parts of salmon, both the edible portion and said oil being intimately associated in a sealed container.

LAWRENCE T. HOPKINSON.

CERTIFICATE OF CORRECTION.

Patent No. 1,970,308.  August 14, 1934.

LAWRENCE T. HOPKINSON.

It is hereby certified that error appears in the printed specification of the above numbered patent requiring correction as follows: Page 1, line 72, for "foods" read food; page 3, line 93, for "known" read unknown; page 4, lines 4 and 13, claims 1 and 2 respectively, before "low" insert the word relatively; and that the said Letters Patent should be read with these corrections therein that the same may conform to the record of the case in the Patent Office.

Signed and sealed this 11th day of September, A. D. 1934.

Leslie Frazer (Seal)  Acting Commissioner of Patents.

the appended claims, are to be deemed within the scope and purview thereof.

I claim:

1. The method of preparing low grade salmon for food which includes removing the inedible portion of the salmon, cooking the edible portion, extracting oil from the inedible portion, removing the supernatant liquid from the cooked salmon, separating the oil from said liquid, packing the edible portion into containers, covering with oil derived from the edible and inedible portions, and then sealing the containers.

2. The method of preparing low grade salmon for food which includes cleaning the salmon of inedible waste, packing the edible portion of the salmon into containers, removing free water from the salmon in the containers, extracting oil from the waste, covering the fish in the containers with said oil, and sealing the containers.

3. The method of preparing relatively low grade salmon for food which includes cleaning the salmon to remove the heads, entrails and fins, cooking the cleaned salmon to loosen the skin and backbone, removing the skin and backbone, heating the salmon meat, removing the free liquids from the salmon meat, extracting oil from said liquids, extracting oil from some at least of the heads, entrails and fins, associating in containers the cooked salmon meat with oil from both sources, and sealing the containers.

4. The method of preparing relatively low grade salmon for food which includes removing the head, entrails and fins, cooking the cleaned salmon, extracting oil from some at least of the head, entrails and fins, removing the supernatant water from the cooked salmon, and replacing said water with said oil.

5. A substantially water-free canned salmon product comprising the combination of a quantity of cooked edible portion of relatively low grade salmon and a quantity of salmon oil greater than that naturally occurring in said quantity of edible portion, both the edible portion and the oil being intimately associated in a sealed container.

6. A substantially water-free canned salmon product comprising the combination of a quantity of cooked edible portion of relatively low grade salmon including substantially all the oil naturally occurring in said quantity and a quantity of oil derived from inedible parts of salmon, both the edible portion and said oil being intimately associated in a sealed container.

LAWRENCE T. HOPKINSON.

CERTIFICATE OF CORRECTION.

Patent No. 1,970,308.            August 14, 1934.

LAWRENCE T. HOPKINSON.

It is hereby certified that error appears in the printed specification of the above numbered patent requiring correction as follows: Page 1, line 72, for "foods" read food; page 3, line 93, for "known" read unknown; page 4, lines 4 and 13, claims 1 and 2 respectively, before "low" insert the word relatively; and that the said Letters Patent should be read with these corrections therein that the same may conform to the record of the case in the Patent Office.

Signed and sealed this 11th day of September, A. D. 1934.

Leslie Frazer

Acting Commissioner of Patents.

(Seal)